United States Patent [19]

Uchikawa et al.

[11] 4,371,581

[45] Feb. 1, 1983

[54] SOUND ABSORBER

[75] Inventors: Fusaoki Uchikawa, Kamakura; Hideharu Tanaka; Mutsuo Sekiya, both of Amagasaki; Yasufumi Ohata, Tokyo, all of Japan

[73] Assignee: Mitsubishi Denki Kabushiki Kaisha, Tokyo, Japan

[21] Appl. No.: 300,519

[22] Filed: Sep. 9, 1981

[30] Foreign Application Priority Data

Mar. 17, 1981 [JP] Japan ................................. 56-41386
Mar. 24, 1981 [JP] Japan ................................. 56-43455

[51] Int. Cl.³ ............................................. B32B 5/16
[52] U.S. Cl. .................................. 428/304.4; 181/204; 428/36; 428/317.9; 428/320.2; 428/328; 428/329
[58] Field of Search ............... 428/36, 304.4, 317.9, 428/320.2, 328, 329, 330; 181/175, 204

[56] References Cited

U.S. PATENT DOCUMENTS 4,264,660 4/1981 Siebels ................................. 428/329

Primary Examiner—William J. Van Balen
Attorney, Agent, or Firm—Oblon, Fisher, Spivak, McClelland & Maier

[57] ABSTRACT

A sound absorber comprises a layer of a composition of a heat resistant binder and a low temperature oxidizing catalyst which is coated on a porous metal substrate in the hardened form.

9 Claims, 5 Drawing Figures

SOUND ABSORBER

BACKGROUND OF THE INVENTION

1. Field of the Invention

The present invention relates to a sound absorber which can be used in a muffler for an internal-combustion engine.

2. Description of the Prior Art

It has been known to use a glass wool, a porous ceramic board and a porous metal board as a sound absorber used in a muffler for an internal-combustion engine. When these boards are used as the sound absorber, a tar or a soot as a combustion residue of gasoline is adhered on the surface of the board to cause clogging for a relatively short time during the operation of an internal-combustion engine whereby the sound absorption characteristic is lowered and the noise is increased.

When the glass wool or the porous ceramic is used as a sound absorber in a muffler for an internal-combustion engine, a flow speed of an exhaust gas is usually fast and a vibration is usually high whereby the sound absorber may be pulverized or damaged and can not be practically used.

The exhaust gas in the muffler is usually at a high temperature as about 400° to 800° C. and contains corrosive sulfur oxides and nitrogen oxides. Therefore, when the porous metal substrate is used in the muffler, serious corrosion is caused by the oxidation at high temperature and the clogging is caused by the corrosion product or the base of the porous metal substrate is corroded to be diminished and it can not be practically used except using a special heat resistant alloy for the porous metal substrate. Moreover, as the fundamental property of the porous metal substrate, pore diameters are relatively large and a porous metal substrate having excellent sound absorption characteristic is not easily obtained. These conventional products could not be practically used in the muffler for the internal combustion engine.

SUMMARY OF THE INVENTION

It is an object of the present invention to overcome the disadvantages of the conventional sound absorbers and to provide a sound absorber used in a muffler which has excellent sound absorption characteristic and prevents a deterioration of the sound absorption characteristic caused by clogging with tar and soot and is resistant to the oxidation at high temperature.

The foregoing and other objects of the present invention have been attained by providing a sound absorber which comprises a layer of a composition of a heat resistant binder and a low temperature oxidizing catalyst in the hardened form which is coated on a porous metal substrate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In the acoustic absorber of the present invention, a porous metal substrate which is not pulverized or damaged, is used as the sound absorbing substrate and a composition of the heat resistant layer and the low temperature oxidizing catalyst in the hardened form is coated on the porous metal sound absorbing substrate for the three purposes of the prevention of the clogging with the tar or the soot; the improvement of the sound absorption characteristic and the prevention of corrosion deterioration caused by the oxidation at high temperature.

The sound absorber has the layer of the composition of the heat resistant binder and a low temperature oxidizing catalyst formed on the porous metal substrate.

The coated layer comprises the heat resistant binder and the low temperature oxidizing catalyst made of at least one of an oxide of Mn, Cu, Ni, Co, Mo, Cr, Fe, Ag, Zn, Pb, W or V or a complex oxide thereof or a metal of Pt, Pd, Rh, Ru, Ag or Au.

The coated layer has a matrix made of at least one of porcelain enamel, glass frit, an alkali metal silicate, colloidal silica, colloidal alumina, a metal phosphate, a cement or a silicone resin (varnish).

The porous metal substrate can be made of at least one of iron, nickel or chromium as a main component.

The coated layer is preferably porous and is preferably formed on one surface of the porous metal substrate.

It is possible to incorporate a reducing agent and/or an alkaline solid catalyst in the layer of the composition of a heat resistant binder and a lower temperature oxidizing catalyst.

The reducing agent can be at least one of metallic powders, carbon powder, sulfites, ferrous salts and stannous salts which are thermally stable.

The alkaline solid catalyst can be at least one of potassium silicate, sodium aluminate, sodium silicate, lithium silicate, sodium carbonate and alkali metal oxides.

A content of the lower temperature oxidizing catalyst in the coated layer is in a range of 5 to 85 wt.% preferably 20 to 60 wt.%. A content of the reducing agent and/or the alkaline solid catalyst in the coated layer is up to 50 wt.%.

It is especially preferable to have the coated layer made of a matrix of silicone resin and manganese oxide powder and the porous metal substrate made of iron, nickel and/or chromium which is prepared by a powdery metallurgy.

The porous metal substrate preferably has a thickness of 2 to 10 mm and a porosity of 40 to 95%.

The coated layer preferably has a thickness of 10 to 80 $\mu$m a specific surface area of 50 to 500 m$^2$/g.

The present invention will be illustrated by certain examples and references which are provided for purposes of illustration only and are not intended to be limiting the present invention.

EXAMPLE 1

Figure 1A:
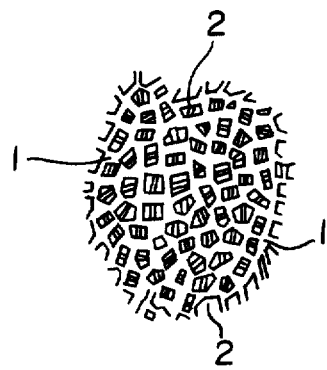
FIG. 1(a) illustrates a porous metal substrate.

A porous metal substrate made of nickel having a thickness of 5 mm which has a microscopic enlarged surface shown in FIG. 1(a) (manufactured by Sumitomo Elec. Ind.) was used as a metallic porous acoustic absorbing substrate. A mixture obtained by mixing the components of the Composition No. 1 by a ball mill for about 30 minutes, was sprayed to uniformly coat it on the porous metal board. In FIG. 1(a), the reference (1) designates a porous metal substrate and (2) designates pores. The coated layer was dried at 80° C. for 30 minutes and baked at 550° C. for 30 minutes to form a hard layer. In the coating of the mixture, if the coated layer is too thick, the sound absorption characteristic is too low.

| Composition No. 1: | |
|---|---|
| Low temperature oxidizing catalyst: | |
| Manganese dioxide: | 50 wt. parts |
| Binder: | |
| Aluminum phosphate: | 40 wt. parts |
| Additives: | |
| Alumina, bentonite, water | 60 wt. parts |

The additives improve coating property and characteristics of the coated layer and increase the strength of the coated layer and the adhesion on the porous metal substrate and form a porous coated layer.

Figure 1B:
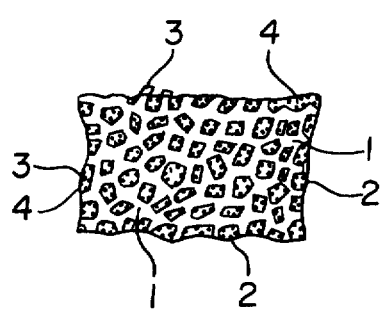
FIG. 1(b) shows an illustration of a partially enlarged section of the sound absorber of the present invention.

The sound absorber of the present invention has the structure shown by a partially enlarged sectional view in FIG. 1(b) wherein the reference (3) designates particles of the low temperature oxidizing catalyst distributed on the surface of the porous metal substrate (1) and in the pores (2); and (4) designates a hardened heat resistant binder in which the particles of the low temperature oxidizing catalyst (3) are dispersed.

The characteristics of the sound absorber were tested in comparison with the porous metal board on which the Composition No. 1 was not coated.

Figure 2:
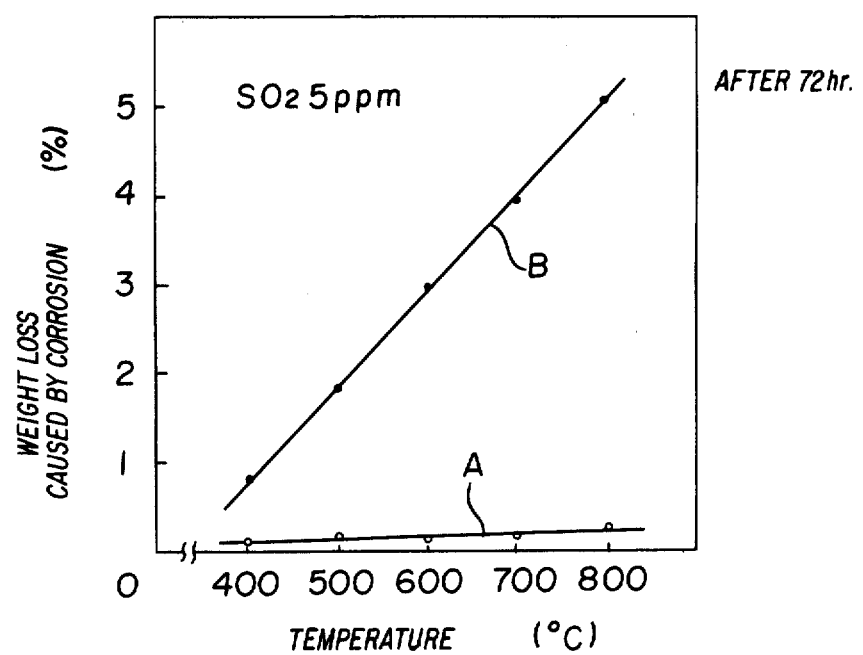
FIG. 2 is a graph showing weight loss in a corrosive atmosphere as a function of temperature for the sound absorber of the present invention (A) and for a porous metal substrate (B)

FIG. 2 shows weight losses caused by corrosion under maintaining the sample in air containing 5 ppm of $SO_2$ in an electric furnace at 400° to 800° C. The curve (A) shows the weight loss of the sound absorber of the present invention obtained by the process and the curve (B) shows the weight loss of the sound absorber of the porous metal substrate. As it is clearly found in FIG. 2, the sound absorber of the present invention had excellent corrosion resistant without a substantial corrosion in the air containing $SO_2$ at 400° to 800° C. which is the temperature of a combustion gas in a muffler of an internal-combustion engine. On the other hand, the conventional porous metal board was corroded to give a remarkable weight loss depending upon the rising of the temperature. The formation of a corrosion product scale having yellowish green was observed on the surface.

Figure 3:
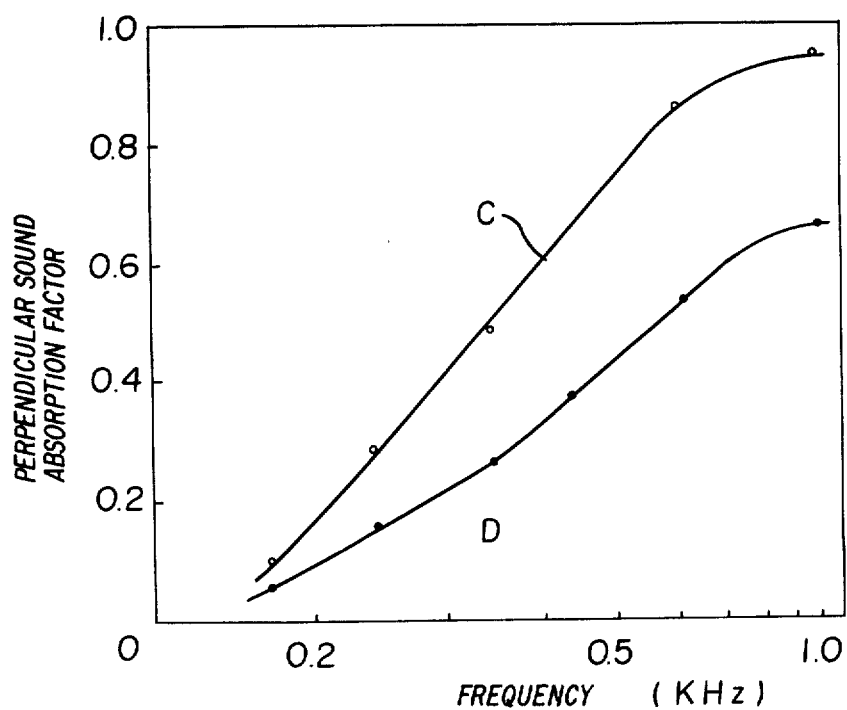
FIG. 3 is a graph showing normal incident sound coefficient as a function of frequency for the sound absorber of the present invention (C) and for a porous metal board (D)

FIG. 3 shows a normal incident sound coefficient measured pursuant to Japanese Industrial Standard A-1405 (Inner tube method). The curve (C) shows the characteristic of the sound absorber of the present invention and the curve (D) shows the characteristic of the sound absorber of the porous metal board. As it is clearly found in FIG. 3, the sound absorber of the present invention had remarkably higher sound absorption coefficient than that of the porous metal substrate.

The product having the structure shown in FIG. 1(b) prepared by coating and baking the Composition No. 1 on the surface of the porous metal substrate has a substantially porous structure and accordingly air can internally flow. That is, the baked, coated layer of the Composition No. 1 forms a part of the sound absorber. The sound absorption coefficiency can be controlled by the coating method.

Figure 4:
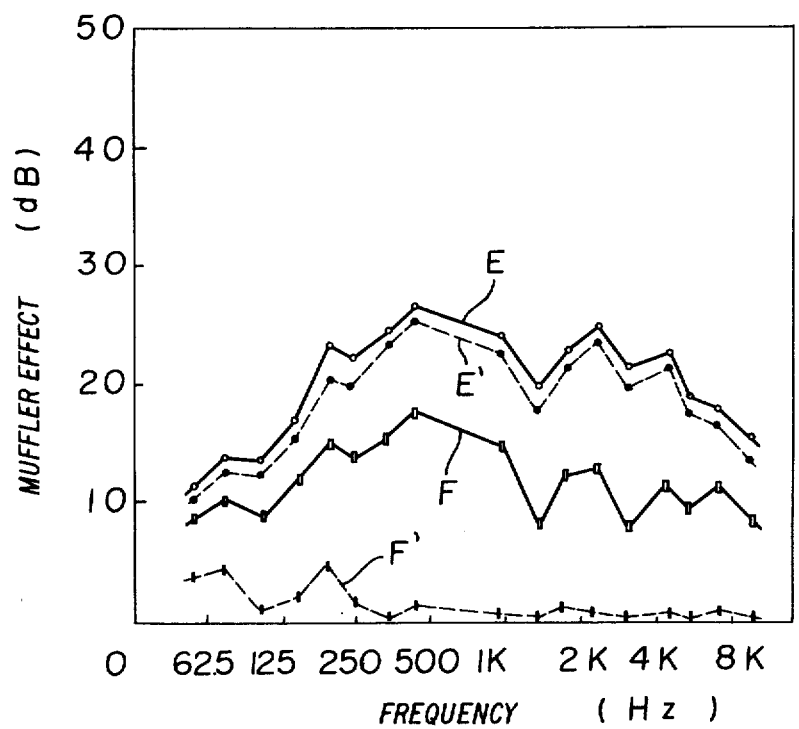
FIG. 4 is a graph showing muffler effects as a function of frequency for the sound absorber of the present invention and for a porous metal substrate.

Each of the sound absorbing substrates was formed in a cylindrical form and was fitted in a muffler of a car (piston displacement of 1,800 cc) and tested by driving about 10,000 km. and the muffler effect was measured pursuant to Japanese Industrial Standard D 1616. FIG. 4 shows the characteristics of muffler effects in comparison with the initial muffler effects. The curves (E) and (E') respectively show characteristics of the sound absorber of the present invention at the initiation and after driving. The curves (F) and (F') respectively show characteristic of the sound absorber of the porous metal substrate at the initiation and after driving. As it is clearly found from FIG. 4, the initial muffler effect was excellent and the muffler effect was not substantially reduced after driving for 10,000 km. in the case of the use of the sound absorber of the present invention. On the other hand, the muffler effect was remarkably reduced in all of the measured frequency bands after driving for 10,000 km. in the case of the use of the porous metal substrate as the sound absorber. After the measurements of the muffler effect, both the sound absorbers where taken out and observed. The sound absorber of the present invention was substantially clean as the initial. On the contrary, the sound absorber of the porous metal substrate caused serious clogging by an adhesion of a large amount of a yellowish green corrosion product and black tar and soot as combustion residues on the surface of the sound absorber. As it is found from the result, the low temperature oxidizing catalyst particles dispersed in the sound absorber of the present invention are activated at the temperature of the combustion gas whereby the combustion residues are oxidized (surface combustion) to remove them at the temperature of the combustion gas lower than the firing temperature thereof. Therefore, the initial muffler effect may be maintained.

EXAMPLE 2

A powder-sintered metal board made of gun metal having a thickness of 5 mm was used as a metallic porous sound absorbing substrate. Each mixture having Composition 2 or 3 was kneaded and sprayed to coat it on the metallic porous substrate and baked it to form a hardened layer by the process of Example 1. The sound absorber of the present invention were obtained.

| Composition No. 2: | |
|---|---|
| Low temperature oxidizing catalyst: | |
| Copper oxide: | 50 wt. parts |
| Binder: | |
| Silicone resin: | 30 wt. parts |
| Additives: | |
| Silica, calcium oxide and thinner: | 60 wt. parts |
| Composition No. 3: | |
| Low temperature oxidizing catalyst: | |
| Nickel oxide: | 30 wt. parts |
| Manganese dioxide: | 30 wt. parts |
| Binder: | |
| Sodium silicate: | 40 wt. parts |

| Additive: | |
| --- | --- |
| Alumina, magnesium oxide and water: | 60 wt. parts |

In accordance with the test methods of Example 1, the characteristics of the resulting sound absorbers and the metallic porous sound absorbing substrate having no coating of Composition 2 or 3.

As a result, the sound absorbers having the coated hard layer made of Composition 2 or 3 of the present invention had excellent characteristics of the corrosion resistance, the sound absorption factor, and the prevention of clogging for time change of muffler effect, the same as those characteristics shown in FIGS. 2 to 4.

EXAMPLE 3

In accordance with the process of Example 1 except using a foamed metal board made of nickel having a thickness of 5 mm (Cellmet manufactured by Sumitomo Denko K.K.) as a metallic porous sound absorbing substrate and spraying a mixture having Composition No. 4, a sound absorber of the present invention was obtained and a test for muffler effect was performed.

| Composition No. 4: | |
| --- | --- |
| Low temperature oxidizing catalyst: | |
| Chromium oxide: | 30 wt. parts |
| Reducing agent: | |
| Silver powder: | 30 wt. parts |
| Binder: | |
| Aluminum phosphate: | 40 wt. parts |
| Phosphoric acid frit: | 15 wt. parts |
| Additives: | |
| Alumina, bentonite, water: | 80 wt. parts |

Figure 5:
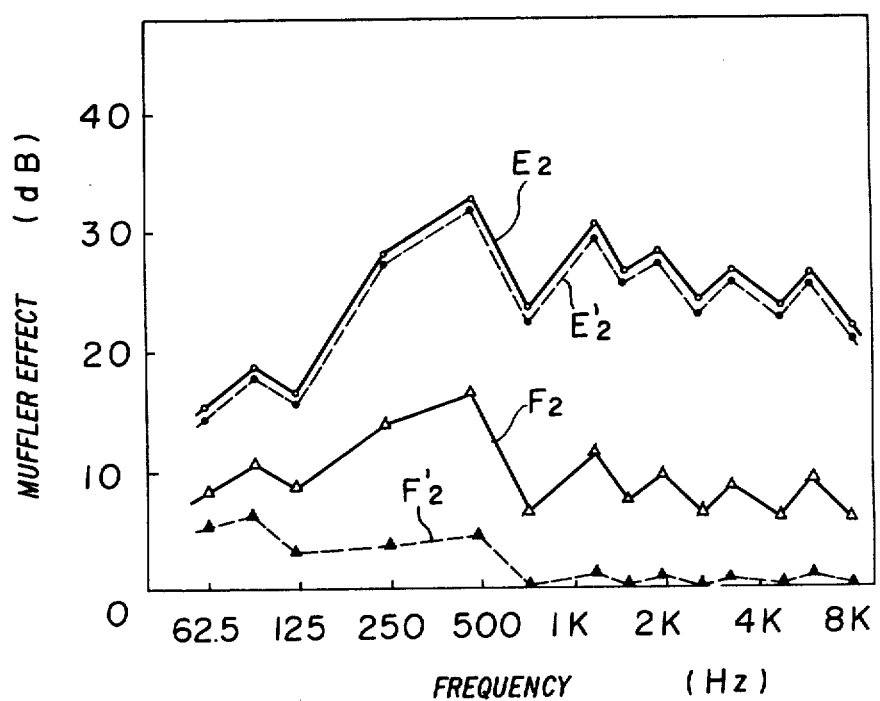
FIG. 5 is also a graph showing muffler effects as a function of frequency for the sound absorber of the present invention and for a porous metal substrate.

FIG. 5 shows the characteristics of muffler effects in comparison with the initial muffler effects. The curves ($E_2$) and ($E'_2$) respectively show characteristics of the sound absorber of the present invention at the initiation and after driving. The curves ($F_2$) and ($F'_2$) respectively show characteristics of the sound absorber of the porous metal substrate at the initiation and after driving. As it is clearly found from FIG. 5, the initial muffler effect was excellent and the muffler effect was not substantially reduced after driving for 10,000 km. in the case of the use of the sound absorber of the present invention.

EXAMPLE 4

In accordance with the process of Example 1 except using a powder sintered metal board (Dia Metfilter manufactured by Mitsubishi Metal K.K.) having a thickness of 5 mm was used as a metallic porous sound absorbing substrate and spraying each mixture having Composition No. 5 or 6 each sound absorber of the present invention was obtained and a test for muffler effect was performed.

The results are substantially the same as Example 3.

| Composition No. 5: | |
| --- | --- |
| Low temperature oxidizing catalyst: | |
| Manganese dioxide: | 20 wt. parts |
| Nickel oxide: | 15 wt. parts |
| Alakline solid catalyst: | |
| Sodium aluminate | 20 wt. parts |
| Potassium silicate: | 10 wt. parts |
| Binder: | |
| Methyl phenyl silicone: | 40 wt. parts |
| Phosphate glass frit: | 15 wt. parts |
| Additives: | |
| Silica, organic modified bentonite thinner: | 70 wt. parts |
| Composition No. 6: | |
| Low temperature oxidizing catalyst: | |
| Copper oxide: | 30 wt. parts |
| Reducing agent: | |
| Stannous sulfate: | 20 wt. parts |
| Alkaline solid catalyst: | |
| Potassium silicate: | 20 wt. parts |
| Binder: | |
| Methyl phenyl silicone | 50 wt. parts |
| Additive: | |
| Alumina, bentonite, thinner: | 70 wt. parts |

The low temperature oxidizing catalysts used in the present invention can be the catalysts used in Compositions 1, 2 or 3 and also metal oxides such as CoO, $Co_3O_4$, $Cr_2O_3$, $Fe_2O_3$, $Ag_2O$, ZnO and PbO, and complex metal oxides such as $NiCr_2O_4$, $MnCr_2O_4$, $CuCr_2O_4$ and $MnFe_2O_4$ and powders or fine powders of noble metals such as Pt, Pd, Rh, Ru and Ag which have the oxidizing catalytic activity and heat resistance. It is possible to use two or more kinds of the catalysts.

The porous metal substrates used as the substrate in the present invention can be porous metal substrates and sintered powder metal substrates used in Examples and also commercially available substrates such as metallic fibers and inorganic fiber reinforced metal. The substrates can be made of nickel, bronze, aluminum and alloys such as Fe-Cr, Fe-Ni-Cr and Fe-Cr-Al.

The heat resistant binders used in the present invention can be porcelain enamel (glass frit), alkali metal silicates, colloidal silica, colloidal alumina, metal phosphates, cements, silicone resins (varnish) and mixtures thereof.

The acoustic absorber of the present invention is used a sound absorber for a muffler for an internal combustion engine and can be also used as a sound absorber for the other apparatuses such as combustion devices.

As described, in accordance with the sound absorber of the present invention, the composition of the heat resistant binder and the low temperature oxidizing catalyst is coated in the hardened form, on the porous metal substrate. Therefore, the sound absorber has excellent sound absorption characteristic, excellent high temperature oxidation resistance and excellent corrosion resistance. When the sound absorber is used as the sound absorber in the muffler for the internal-combustion engine, the deterioration of the muffler effect caused by the clogging with a tar or a soot is prevented and the muffler effect at the initiation can be maintained. Therefore, the sound absorber has excellent characteristic for a long time and can be used in mufflers for internal-combustion engines of cars, etc.

We claim:

1. A sound absorber which comprises a layer of a composition of a heat resistant binder and a low temperature oxidizing catalyst which is coated on a porous metal substrate in the hardened form.

2. The sound absorber according to claim 1 wherein said low temperature oxidizing catalyst is made of at least one of an oxide of Mn, Cu, Ni, Co, Mo, Cr, Fe, Ag, Zn, Pb, W or V or a complex oxide thereof or a metal of Pt, Pd, Rh, Ru, Ag or Au.

3. The sound absorber according to claim 1 wherein said coated layer has a binder in the form of a matrix made of at least one of porcelain enamel, glass frit, an alkali metal silicate, colloidal silica, colloidal alumina, a metal phosphate, a cement or a silicone resin (varnish).

4. The sound absorber according to claim 1 wherein said porous metal substrate is made of at least one of iron, nickel or chromium as a main component.

5. The sound absorber according to claim 1, 2, 3 or 4 wherein said coated layer is a porous layer.

6. The sound absorber according to claim 1 or 5 wherein said coated layer is formed on only one surface of said porous metal substrate.

7. The sound absorber according to claim 1 which is used in an exhaust system of an internal-combustion engine or a combustion device.

8. The sound absorber according to claim 1 wherein said coated layer has a matrix of a silicone resin and manganese oxide powder and said porous metal substrate is made of iron, nickel and/or chromium which is prepared by a powdery metallurgy.

9. The sound absorber according to claim 1 which further comprises a reducing agent and/or an alkaline solid catalyst.

* * * * *